United States Patent [19]

Baika et al.

[11] Patent Number: 4,712,442
[45] Date of Patent: Dec. 15, 1987

[54] LUBRICATING MECHANISM FOR A ROTARY MACHINE

[75] Inventors: Toyokazu Baika; Hidemi Oonaka, both of Susono, Japan

[73] Assignee: Toyota Jidosha Kabushiki Kaisha, Aichi, Japan

[21] Appl. No.: 868,089

[22] Filed: May 29, 1986

[30] Foreign Application Priority Data

Jul. 31, 1985 [JP] Japan .............................. 60-116417[U]

[51] Int. Cl.⁴ .................. F16H 57/04; F16N 1/00; F16N 7/14
[52] U.S. Cl. .................................. 74/467; 74/606 R; 184/6.12; 184/11.2; 384/462; 384/472
[58] Field of Search ................. 74/467, 606 R, 606 A; 184/6.12, 11.1, 11.2; 384/462, 472

[56] References Cited

U.S. PATENT DOCUMENTS

| | | | |
|---|---|---|---|
| 2,519,557 | 8/1950 | Flanagan | 74/606 R X |
| 2,645,305 | 7/1953 | Roos | 184/11.1 |
| 3,195,682 | 7/1965 | Reneerkens | 184/11.1 |
| 3,508,630 | 4/1970 | Keller et al. | 74/467 X |
| 3,587,783 | 6/1971 | Walters et al. | 184/11.1 |
| 4,182,199 | 1/1980 | Watson | 74/606 R |
| 4,498,353 | 2/1985 | Kitade | 74/606 R |
| 4,501,167 | 2/1985 | Saito | 74/467 |

FOREIGN PATENT DOCUMENTS

| | | | |
|---|---|---|---|
| 59-163192 | 11/1984 | Japan . | |
| 61-49185 | 3/1986 | Japan . | |
| 1426352 | 2/1976 | United Kingdom | 74/467 |
| 2147064 | 5/1985 | United Kingdom | 74/467 |

Primary Examiner—Rodney H. Bonck
Assistant Examiner—Richard M. Lorence
Attorney, Agent, or Firm—Parkhurst & Oliff

[57] ABSTRACT

A lubricating mechanism for a rotary machine, such as a Roots blower, of the class having a pair of vertically spaced parallel shafts (20, 22) which are rotated in synchronization with each other by a pair of meshing gears (36, 38) and are provided with bearings (28, 30) and oil seals (40, 42) requiring lubrication. The rotary machine includes an enclosed gear chamber (70) serving to form an oil sump (74) for lubrication of the meshing gears. The lubricating mechanism is intended to lubricate the oil seal (40) and bearing (28) of the upper shaft (20) of the machine located above and remote from the oil sump. The lubricating mechanism comprises a guiding mechanism (80, 82) for positively guiding the lubricant in the oil sump (74) to be entrained in sequence by the lower gear (38) and the upper gear (36) and lifting the lubricant to the upper region of the gear chamber (70). The lubricating mechanism also comprises lubricant passages (56, 58) respectively having an inlet opening into the upper region of the gear chamber (70) and an outlet opening between the oil seal (40) and the bearing (28) associated with the upper shaft (20).

6 Claims, 6 Drawing Figures

LUBRICATING MECHANISM FOR A ROTARY MACHINE

BACKGROUND OF THE INVENTION

1. Field of the Invention

The present invention relates generally to lubrication of a rotary machine. More particularly, the present invention relates to lubrication of a rotary machine of the class wherein a pair of vertically spaced parallel shafts are rotated in a synchronized relationship through a train of gears and wherein the upper shaft has an oil seal and a bearing that require lubrication and that are located vertically remote from an oil sump of the machine. The present invention is specifically applicable to the lubrication of a Roots blower used as a supercharger in an automotive engine. However, the invention is not limited to such application.

2. Description of the Related Art

A Roots blower is known as having a pair of two-lobe cycloidal rotors rotated within a housing in opposite directions with an angular phase difference of 90° to perform a pumping action. Each rotor is mounted on an associated shaft which is journaled to the housing through antifriction bearings. Generally, an external driving power is applied to one of the two shafts, i.e., the drive shaft. The other shaft, i.e., the driven shaft, is rotated in synchronization with the drive shaft through a pair of gears in mesh with each other and mounted on the free ends of the shafts extending outwardly from the housing.

To provide lubrication and protection of the gears, a gear cover is secured to the side plate of the housing to define therebetween a gear chamber surrounding the gears. This gear chamber also serves to define an oil sump for storing a lubricant which lubricates the bearings and the gears. Oil seals are provided between respective rotor shafts and the side plate of the housing to prevent the lubricant from seeping into the working chamber of the blower. These oil seals are located downstream of the bearings with respect to the direction of oil seepage. Practically, the lubricant is charged only in an amount of about one-fourth of the volume of the gear chamber in order to avoid an inevitable loss of drive power of the blower when the gear chamber is fully charged with the lubricant.

When a Roots blower is used as a supercharger for an automotive engine, it is customary to mount the blower in a vertical position so that one of the two rotor shafts is placed vertically above the other. In this situation, only a part of the lower gear, i.e., the gear mounted to the lower rotor shaft, is dipped in the oil sump. The lubricant in the sump is scooped up by the teeth of the rotating lower gear and is transferred onto the upper gear teeth to adequately lubricate the meshing gear surfaces. The lubricant will sufficiently lubricate the bearing and the oil seal associated with the lower rotor shaft since they are partly dipped in or located relatively close to the oil sump, although the amount of lubricant in the oil sump is reduced in order to obviate the afore-mentioned loss of drive power. The bearing and the oil seal associated with the upper rotor shaft, however, tend to be only poorly lubricated because the amount of lubricant transferred from the lower gear onto the upper gear is not only limited but the lubricant tends to spill sideways of the upper gear before being brought to the high level required to lubricate the bearing and oil seal of the upper shaft. This can result in a premature failure of the bearing and, in particular, of the oil seal of the upper rotor shaft. Various lubricating arrangements have been proposed to overcome this problem. For example, Japanese Unexamined Patent Publication No. 61-49185 discloses a specific rear cover design to improve lubrication of the upper shaft bearing and oil seal; Japanese Utility Model Application No. 60-000043 filed Jan. 7, 1985 proposes to provide an oil pool in the gear chamber; and Japanese Utility Model Application No. 60-021247 filed Feb. 19, 1985 proposes a lubricating arrangement having a guide plate adapted to direct the lubricant into inclined oil passages leading to the bearing and oil seal of the upper shaft. Although these arrangements have considerably improved lubrication, it is still desirable to positively prevent the lubricant from escaping sideways from the rotating lower and upper gears.

SUMMARY OF THE INVENTION

The object of the present invention is to provide a lubrication arrangement wherein the lubricant is positively transferred to the top of the rotating upper gear without being substantially spilled during the course of transfer.

This invention provides a lubricating mechanism for use in a rotary machine, such as a Roots blower, of the type having a pair of vertically-spaced parallel shafts which are rotated in synchronization through a pair of meshing gears and which are provided with respective bearings and oil seals. These gears are lubricated by the lubricant stored in an oil sump formed by the gear chamber defined between the machine housing and a gear cover attached thereto. According to the invention, the lubricating mechanism is intended to lubricate the bearing and the oil seal associated with the upper shaft and comprises a lubricant passage formed in the housing of the rotary machine and a guiding mechanism for positively guiding the lubricant in such a manner that it is transferred along the teeth of the respective gears from the bottom to the top thereof in the direction of rotation thereof. The guiding mechanism thus serves to prevent the lubricant being transferred by the gears from being spilled off the gear teeth in directions radially inwardly and outwardly of the respective gears. The lubricant passage formed in the housing has an outlet port that opens between the bearing and the oils seal associated with the upper shaft and has an inlet port which opens into the gear chamber and is located at a level higher than that of the outlet port. With this arrangement, a part of the lubricant which has been transferred to the top of the upper gear will flow down to reach the inlet of the lubricant passage, and then flow therethrough to lubricate the bearing and the oil seal of the upper shaft.

In a preferred embodiment of the invention, the guiding mechanism comprises a pair of arcuate guiding ribs projecting inwardly from the gear cover, each of the ribs extending from the bottom to the top of respective gears along a bottom land circle thereof in the direction of rotation of the respective gears. The inner end of the ribs is spaced by a small clearance from the opposite end surface of the gears in order to minimize the leakage of lubricant therethrough, while permitting the gears to rotate without interference from or contact with the ribs.

These and other features of the invention will be described in more detail hereinafter with reference to the accompanying drawings.

DESCRIPTION OF THE PREFERRED EMBODIMENT

The present invention will be described as applied to a Roots blower which may be used as a supercharger in an automotive engine.

Figure 1:
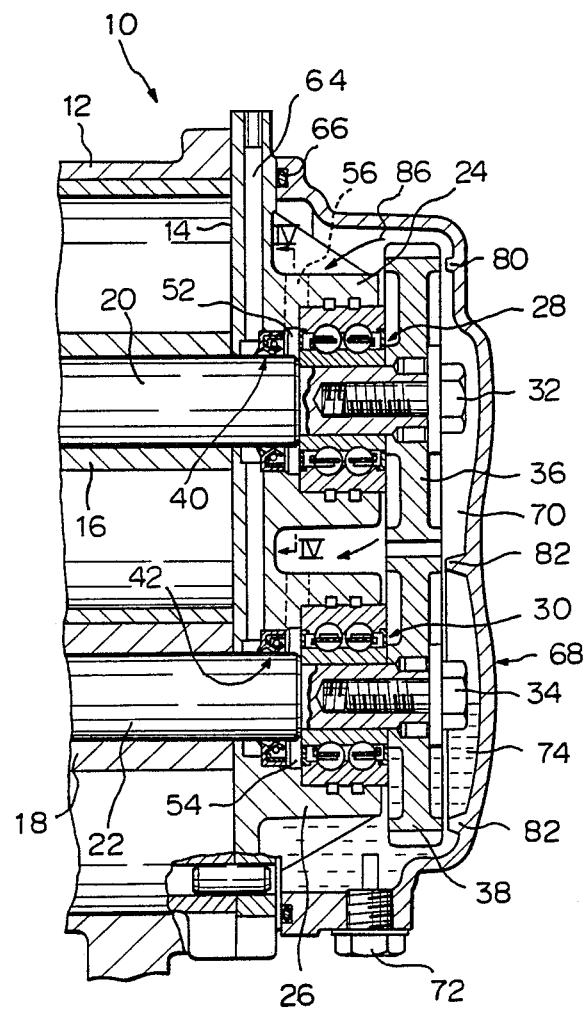
FIG. 1 is a cross-sectional view showing a part of a Roots blower incorporating the lubricating mechanism according to the embodiment of the invention.
Figure 2:
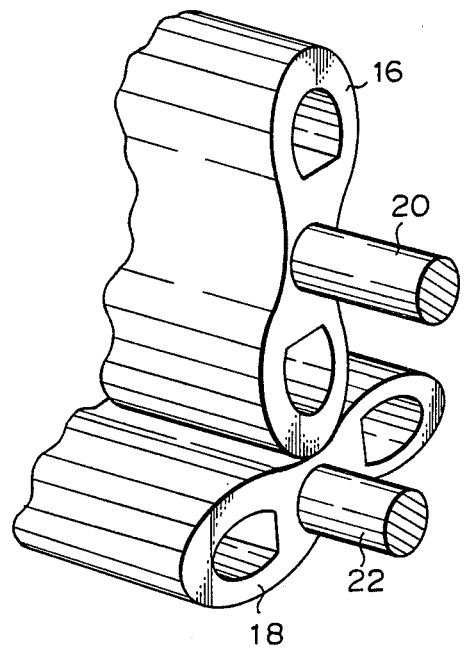
FIG. 2 is a schematic partial representation of the cooperating rotors of the Roots blower shown in FIG. 1.

Referring to FIG. 1, the Roots blower comprises a housing 10 of the conventional design including a cylinder 12, a rear plate 14, and a front plate (not shown). As is well known in the art, a working chamber defined within the housing 10 receives a pair of cooperating rotors 16 and 18 inscribing the inner wall of the cylinder 12 with a small clearance. As schematically shown in FIG. 2, the rotors 16 and 18 have a two-lobe cycloidal configuration and are mounted on respective shafts 20 and 22 with an angular phase difference of 90°. The left-hand end of each shaft 20/22, as viewed in FIG. 1, is journaled to the front plate of the housing 10 through a suitable bearing assembly (not shown). The shafts 20 and 22 extend rearward through the rear plate 14 and are journaled to the rear plate 14 by means of respective bearing assemblies 28 and 30 mounted within bosses 24 and 26.

A pair of gears 36 and 38 are mounted on the right-hand ends of the shafts 20 and 22 and are rigidly fastened thereto by bolts 32 and 34 in such a manner that the angular phase difference between the rotors 16 and 18 is equal to 90°. The gears 36 and 38 are identical with each other so that rotation of one of the gears will cause the other gear to rotate in the opposite direction at an equal rotational speed. Either one of the shafts 20 and 22 may be a drive shaft, the other shaft serving as a driven shaft. The left-hand end of the drive shaft may be connected through an electromagnetic clutch (not shown) to the output shaft of the engine in the conventional manner.

Figure 3:
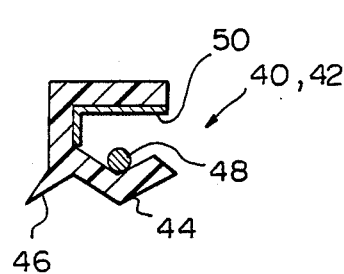
FIG. 3 is a cross-sectional view of the oil seal.
Figure 4:
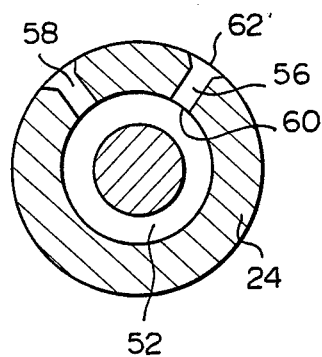
FIG. 4 is a cross-sectional view taken along the line IV—IV of FIG. 1.

Spaced from the bearing assemblies 28 and 30 and at the left thereof, oil seals 40 and 42 are provided around the shafts 20 and 22 to prevent the lubricant that has lubricated the bearing assemblies from seeping into the working chamber of the blower. The oil seals 40 and 42 are of the conventional design and comprise a main lip 44, an auxiliary lip 46, an elastic band 48, and a metal ring 50, as shown in FIG. 3. The band 48 urges the main lip 44 into tight contact with the outer surface of the shaft 20/22 to seal the shaft. The auxiliary lip 46 serves to prevent the dust and particles generated in the working chamber from ingress to the main lip 44. As shown in FIG. 1, the oil seals 40 and 42 are axially spaced from the respective bearing assemblies 28 and 30 to define annular chambers 52 and 54 therebetween. As shown in FIG. 4, the boss 24 of the rear plate 14 is provided with a pair of inclined radial passages 56 and 58, each having an outlet 60 opening into the annular chamber 52 and an inlet 62 opening on the outer surface of the boss 24. Since the inlet 62 is located at a level higher than that of the outlet 60, the lubricant flowed into the inlet 62 will flow down the passage 56/58 into the annular chamber 52 to thereby lubricate both the bearing assembly 28 and the oil seal 40. After lubricating these members, the lubricant will flow down through the annular gap between the outer and inner races of the bearing assembly. Similar lubricant passages are provided in the lower boss 26. Although in the illustrated embodiment two passages are provided for each of the bosses 24 and 26, it is recognized that only one passage is sufficient for the purpose of the present invention.

As shown in FIG. 1, the rear plate 14 has a vertical vent passage 64 extending across the auxiliary lip 46 of respective oil seals 40 and 42 and opening into the ambient atmosphere. This vent passage 64 serves to release compressed air leaking from the working chamber.

A gear cover 68 is fastened to the rear plate 14 to define an enclosed space 70 serving as a gear chamber. This space 70 also serves to form an oil sump. A sealing member such as an O-ring 66 is provided between the gear cover 68 and the rear plate 14 to seal the space 70. The gear cover 68, the rear plate 14, and the cylinder 12 may be fastened together by suitable through-bolts (not shown) screwed into threaded bores formed in the cylinder 12. An amount of lubricant of, for example, about 0.1 liter, is charged within the gear chamber 70 to form the oil sump 74. A drain plug 72 is provided at the bottom of the gear cover 68.

Figure 5:
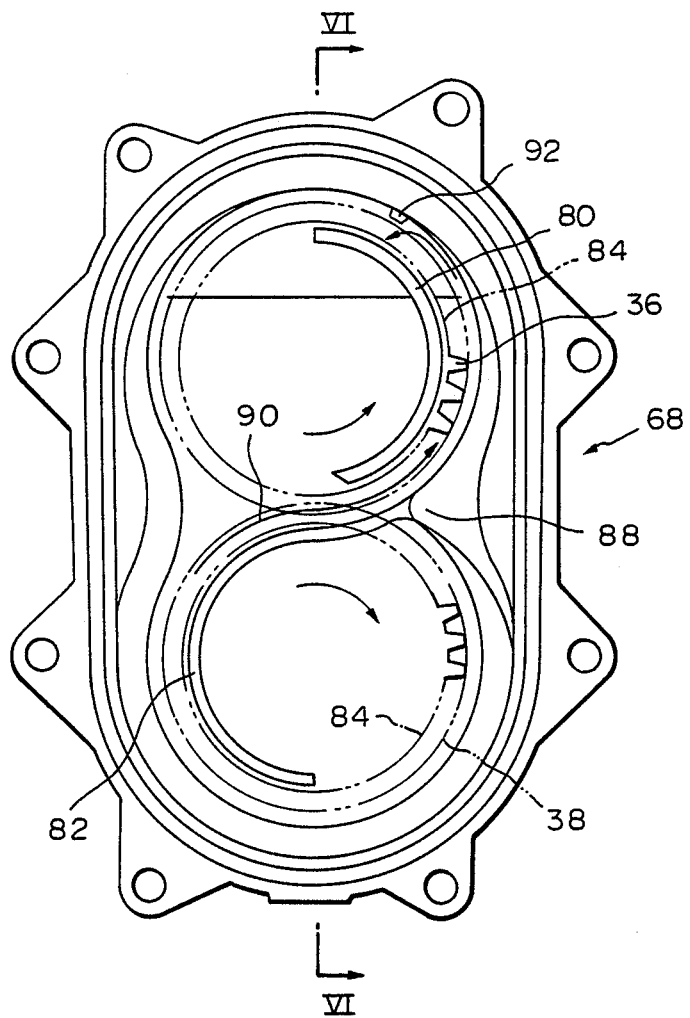
FIG. 5 is a front elevational view of the gear cover illustrating the design of the guiding ribs.
Figure 6:
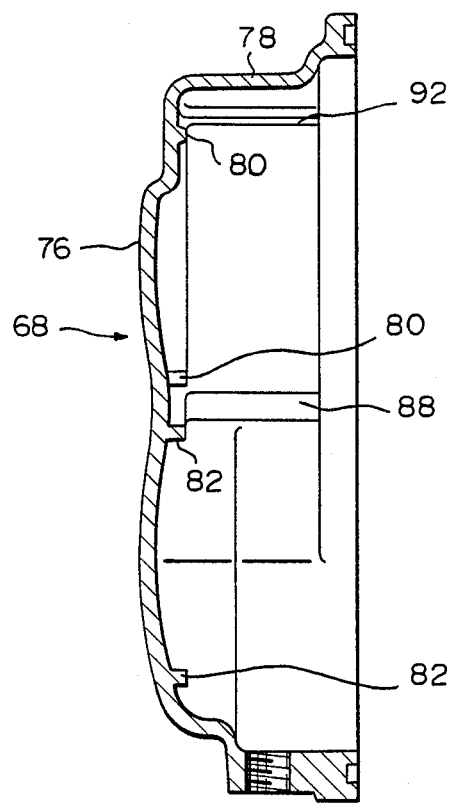
FIG. 6 is a cross-sectional view taken along the line VI—VI of FIG. 5.

As shown in FIGS. 5 and 6, the gear cover 68 is shaped to accommodate the gears 36 and 38 and includes an end wall 76 and a side wall 78. As is best illustrated in FIG. 5, the end wall 76 is integrally provided with arcuate guiding ribs 80 and 82 projecting inwardly therefrom and forming the guiding mechanism of the invention. The guiding ribs 80 and 82 begin at the bottom of respective gears 36 and 38 and extend in the direction of rotation of the respective gears 36 and 38 up to the top thereof. As shown in FIG. 5, the outer contour of the respective guiding ribs 80 and 82 extends slightly radially inwardly of the bottom land circle 84 of the respective gears 36 and 38. As shown in FIG. 1, the guiding ribs 80 and 82 project inwardly toward the gears 36 and 38 but terminate with a small clearance therebetween of, for example, about 2.5 mm.

Lubrication of the various moving parts of the blower is effected in the following manner. The bearing assembly 30 and the oil seal 42 associated with the lower shaft 22 will be lubricated without problem since they are partly dipped in the lubricant in the oil sump 74. Similarly, the meshing gears 36 and 38 will be sufficiently lubricated as the lower gear 38 is partly immersed in the oil sump.

The lubricant in the oil sump 74 must be transferred to the top region of the gear chamber 70 to ensure lubrication of the bearing assembly 28 and the oil seal 40 associated with the upper rotor shaft 20. This is accomplished as follows. As the meshing gears 36 and 38 rotate, the lubricant in the sump 74 is first scooped up by the teeth of the lower gear 38. As the lower gear 38 rotates, the lubricant entrained thereon will be transferred to the top thereof without being spilled sideways therefrom to the right as viewed in FIG. 1, due to the presence of the guiding rib 82 which extends along the gear 38 in the rotational direction thereof and which serves to positively guide the entrained lubricant to be transferred along the rib 82. A part of the lubricant thus brought to the top of the lower gear 38 will then be transferred to the teeth of the upper gear 36 at the meshing point and will be carried further up to the top of the upper gear 36 due to the presence of the upper guiding rib 80. The lubricant will then flow down therefrom as shown by the arrow 86 in FIG. 1 along the outer periphery of the boss 24 of the rear plate 14 and a part thereof will flow through the passages 56 and 58 into the annular space 52, thereby sufficiently lubricating the oil seal 40 associated with the upper rotor shaft 20. After lubricating the oil seal 40, the lubricant in the annular chamber 52 will then flow into the clearance between the outer and inner races of the bearing assembly 28 to thereby lubricate its components. The lubricant then flows down and back to the oil sump 74.

In this manner, the oil seal 40 and the bearing assembly 28 associated with the upper rotor shaft 20 are adequately lubricated, although the amount of lubricant in the oil sump 74 is minimized. Improved lubrication of the upper oil seal 40 contributes to the avoidance of any premature wear and degradation of the oil seal 40, and thus permits the oil seal to function at an optimum sealability and reliability for an extended service life. Therefore, there is no likelihood of lubricant leakage, and thus the rotary machine may be operated for a longer period without requiring a replenishment and investigation of the lubricant, once it is initially charged. This is particularly advantageous in the case of a Roots blower used as an automotive engine supercharger.

As can be seen in FIG. 5, the lower gear 38 transports lubricating oil from the sump at the bottom thereof to the top area of that gear 38, along generally upwardly oriented teeth portions (left hand half portion in FIG. 5). Lubricating oil is then transferred from the lower gear 38 to the upper gear 36 at the intermeshing region therebetween. The teeth, or the outer periphery of the upper gear 36, in a quarter portion after the intermeshing region are, however, downwardly oriented. Therefore, lubricating oil being transferred upwardly may be affected by gravity and pulled down and away from the upper gear 36, with the result that lubricating oil is not transported as effectively to a desired level higher than the inlet opening 62. It is, therefore, desirable to prevent lubricating oil from being pulled away from the upper gear 36.

As shown in FIGS. 5 and 6, the central portion 88 of the side wall 78 of the gear cover 68 that is situated underneath the upper guiding rib 80 is preferably shaped to bulge inwardly, i.e., to the left as viewed in FIG. 5, and the upper portion of the lower guiding rib 82 is extended to merge into the central portion 88. As seen most particularly in FIG. 5, central portion 88 at least partly surrounds the upper gear 36 with a slight radial clearance therebetween. Central portion 88 cooperates with the upper gear 36 and constitutes a bottom trough to receive lubricating oil from the upper gear 36. The upper rib 80 may thus constitute a wall opposite to the bottom of the trough constituted by the central portion 88, so as to define a constricted passage in which the teeth of the upper gear 36 may work like a pump element. The generally horizontal upper portion of the lower rib 82 also serves to receive dropped lubricating oil to retain it thereon and subject it to the pumping action by the teeth of the gears. With this arrangement, the lubricant entrained by the lower gear 38 will be guided to flow along the sinusoidal arrow 90 shown in FIG. 5 and will be more smoothly transferred to the teeth of the upper gear 36, thereby increasing the flow rate of the upwardly directed lubricant flow.

Also, a horizontally extending dam member 92 may be formed on the inner periphery of the side wall 78 of the gear cover 68. This dam member 92 is positioned at an angular position such that it is situated by a small distance at the leading side of the inlet of one of the passages 58 and 60 with respect to the direction of rotation of the upper gear 36. The dam member 92 serves to block the laminar flow of lubricant flowing along the inner periphery of the side wall 78 and to direct it toward the inlet of the passage, thereby increasing the lubrication effect.

The dam member 92 works effectively as described above due to the provision of the narrow passage constituted between the inner surface of the sidewall 78 and the upper rib 80. One side of such a passage constituted between the inner surface of the sidewall 78 and the upper rib 80 is further closed by the end wall 76 of the cover 68, which is shown, has a generally flat surface arranged in a face to face relationship relative to the outer surfaces of the gears.

We claim:

1. A rotary machine having a housing, comprising:
   an upper and a lower shaft journaled in the housing at respective bearings, said shafts being parallel with each other and vertically spaced from each other, each of the shafts having an end extending outward beyond the housing;
   an upper and a lower gear respectively secured to said shaft ends for rotation therewith, said gears being in mesh with each other to cause the shafts to rotate in a synchronized relationship;
   a cover secured to the housing to define a sealed chamber for surrounding the gears and storing a quantity of lubricant sufficient to immerse a part of the lower gear, the teeth of said lower gear entraining said lubricant upon immersion therein;
   a pair of oil seal members respectively disposed around the shafts, sealing the shafts to prevent the lubricant from entering inside the housing, said oil seal members being located adjacent to the bearings between said bearings and said housing;
   a lubricating mechanism for supplying the lubricant transferred upward by the gears to the oil seal member and the bearing associated with the upper shaft;
   a lubricant passage in said lubricating mechanism formed through a boss in the housing having an outlet opening between the bearing and the oil seal member associated with the upper shaft, and an inlet located at a level higher than that of the outlet and opening into the upper part of the sealed chamber; and
   guiding means arranged with said upper and lower gears for positively guiding the lubricant entrained by the teeth of said upper and lower gears while said lubricant is transferred from the bottom of said lower gear to the top of said upper gear, said guiding means being arranged to substantially prevent the lubricant entrained by said teeth from spilling off said teeth in directions radially inwardly and outwardly of the respective gears during said lubrication transfer.

2. A lubricating mechanism according to claim 1, wherein said guiding means comprises a pair of arcuate guiding ribs projecting inwardly from the cover toward the gears terminating with a small clearance therebetween, each of the ribs extending from the bottom to the top of respective gears along the bottom land circles thereof in the directions of rotation thereof.

3. A lubricating mechanism according to claim 2, wherein the cover comprises an end wall and a side wall, wherein a central portion of the side wall located underneath the guiding rib associated with the upper gear projects toward the top of the guiding rib associated with the lower gear, and wherein the upper part of the lower guiding rib is smoothly merged into the central portion.

4. A lubricating mechanism according to claim 3, further comprising means for directing the flow of lubricant flowing along the inner periphery of the side wall toward the lubricant passage.

5. A lubricating mechanism according to claim 4, wherein said directing means comprises a dam member formed on the inner periphery of the side wall at a position situated by a small distance therefrom at a leading side of the passage.

6. A rotary machine having a housing, comprising:
an upper and a lower shaft journaled in the housing at respective bearings, said shafts being parallel with each other and vertically spaced from each other, each of the shafts having an end extending outward beyond the housing;
an upper and a lower gear respectively secured to said shaft ends for rotation therewith, said gears being in mesh with each other to cause the shafts to rotate in a synchronized relationship;
a cover secured to the housing to define a sealed chamber for surrounding the gears and storing a quantity of lubricant sufficient to immerse a part of the lower gear, the teeth of said lower gear entraining said lubricant upon immersion therein;
a pair of oil seal members respectively disposed around the shafts, sealing the shafts to prevent the lubricant from entering inside the housing, said oil seal members being located adjacent to the bearings between said bearings and said housing;
a lubricating mechanism for supplying the lubricant transferred upward by the gears to the oil seal member and the bearing associated with the upper shaft;
a lubricant passage in said lubricating mechanism formed through a boss in the housing having an outlet opening between the bearing and the oil seal member associated with the upper shaft, and an inlet located at a level higher than that of the outlet and opening into the upper part of the sealed chamber; and
guiding means arranged with said upper and lower gears for positively guiding the lubricant entrained by the teeth of said upper and lower gears while said lubricant is transferred from the bottom of said lower gear to the top of said upper gear, said guiding means comprising a pair of arcuate guiding ribs projecting inwardly from the cover toward the gears and terminating with a small clearance therebetween, each of the ribs extending from the bottom to the top of respective gears along bottom land circles of the gears in the directions of rotation thereof; said cover comprising an end wall and a sidewall, wherein a central portion of the sidewall located underneath the guiding rib associated with the upper gear projects toward the top of the guiding rib associated with the lower gear and wherein the upper part of the lower guiding rib is smoothly merged into the central portion.

* * * * *